United States Patent [19]
Kittlety et al.

[11] Patent Number: 5,335,693
[45] Date of Patent: Aug. 9, 1994

[54] VALVE

[76] Inventors: Leslie M. Kittlety, 63 Panorama Drive; Paul J. Oudeman, 33 Cityview Terrace, both of Nambour, Queensland 4560, Australia

[21] Appl. No.: 85,653

[22] Filed: Jun. 30, 1993

[30] Foreign Application Priority Data

Jul. 3, 1992 [AU] Australia .............................. PL 3299

[51] Int. Cl.$^5$ ............................................. F16K 11/02
[52] U.S. Cl. .............................. 137/625.26; 137/595; 251/26; 251/30.02; 251/144
[58] Field of Search ................ 251/26, 30.02, 144; 137/595, 597, 625.26

[56] References Cited

U.S. PATENT DOCUMENTS

| | | | |
|---|---|---|---|
| 984,440 | 2/1911 | Parrott | 137/595 X |
| 2,049,997 | 8/1936 | Eaton | 251/144 X |
| 2,200,578 | 5/1940 | Mahon | 137/595 X |
| 2,888,030 | 5/1959 | McQueen | 251/26 X |
| 3,088,481 | 5/1963 | Brueckner | 137/625.26 X |
| 3,151,835 | 10/1964 | Miller | 251/144 X |
| 4,259,985 | 4/1981 | Bergmann | 137/595 |
| 4,360,036 | 11/1982 | Shelton | 137/625.26 X |
| 4,961,441 | 9/1990 | Salter | 251/30.02 X |

*Primary Examiner*—Stephen M. Hepperle
*Attorney, Agent, or Firm*—Spensley Horn Jubas & Lubitz

[57] ABSTRACT

An automatic hydraulic valve which operates with pressurized fluid, particularly water. The valve closes when fluid pressure is applied and opens when the fluid pressure is withdrawn. It comprises a closed housing having a fluid inlet and outlet and an open housing which accommodates a plug on the end of a plunger reciprocating between the closed and open housings. The valve is particularly suitable for use with evaporative air conditioners.

7 Claims, 2 Drawing Sheets

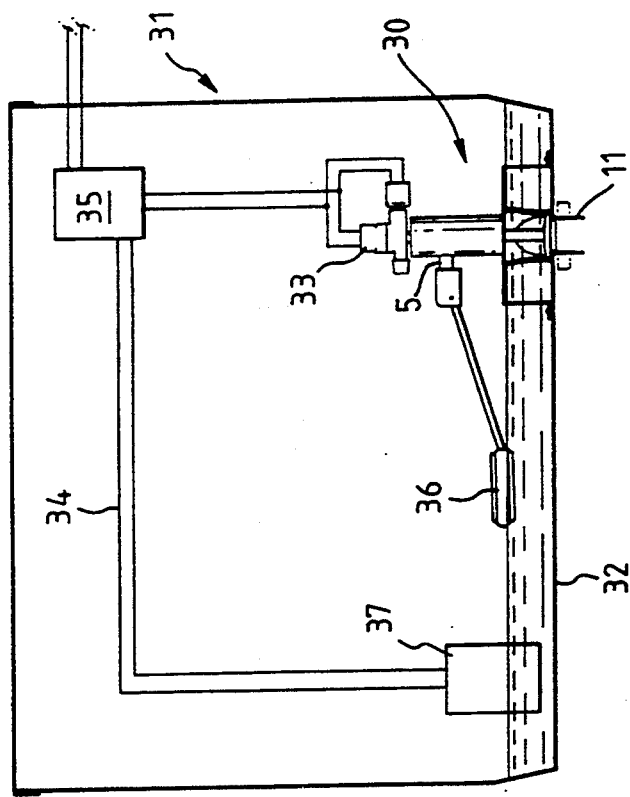
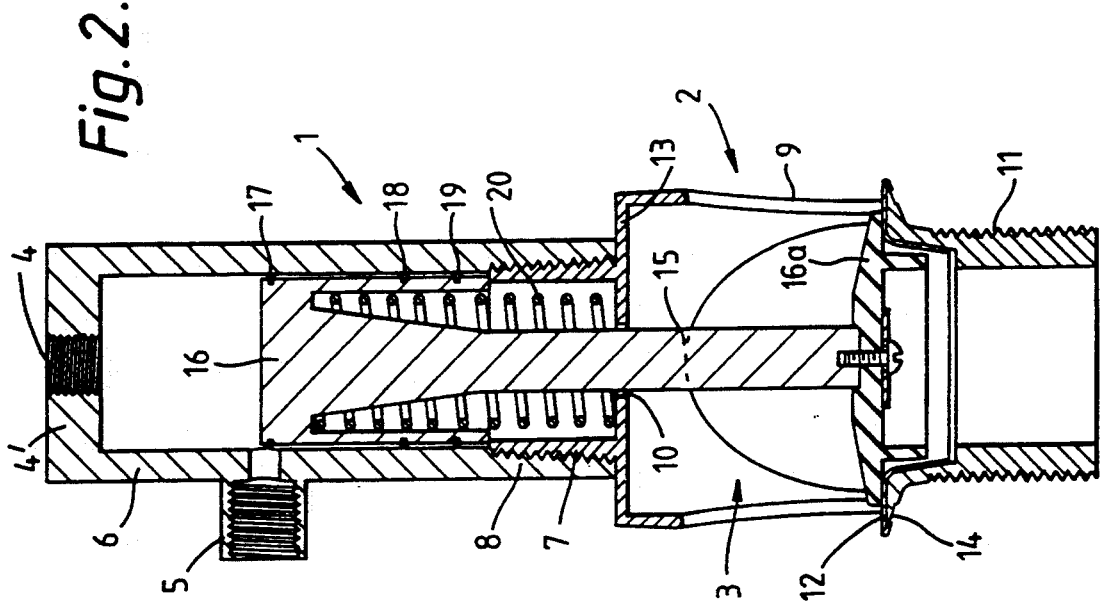

ized hydraulic fluid is passed through the inlet, it impacts upon the sealing member moving the plunger through the open structured portion of the housing to seat the plug on the plug seat, simultaneously bringing the inlet and outlet into fluid communication with one another.

VALVE

FIELD OF THE INVENTION

This invention relates to valves and is primarily concerned with valves which can be incorporated into evaporative air conditioning systems to enable those systems to dry out during periods of non-use, thereby substantially obviating the proliferation of microorganisms which commonly occurs in the base region of such systems, particularly in the water reservoir.

BACKGROUND OF THE INVENTION

Stringent health requirements govern the legal operation of evaporative air conditioners to ensure that public health standards are not violated. One requirement is a minimum three monthly cleaning of the drainage system. However, it is found in practice, particularly in hot climates and when the air conditioner is not in frequent use, significant microorganism populations can still grow in the water reservoir of the air conditioner in the period between cleaning.

In order to address this problem, and the general problem of having the base of the air conditioner permanently wet which leads to corrosion and other deterioration of the system, dump valves of various construction have been proposed to be incorporated in the water reservoir. Such dump valves are typically designed to release the water from the reservoir at regular intervals or when the air conditioner is turned off. Unfortunately however, there are problems associated with these dump valves which means that they do not fully meet the requirements for which they were designed. For instance, a common problem is that they are fitted to a typical waste outlet having a rim which prevents the last few milliliters of water from draining from the reservoir. Such a small quantity of water having a large surface area, is an ideal growth medium for microorganisms. Another problem is due to the manner in which the dump valve operates. Usually, operation is controlled by a 240 volt power source—which can be dangerous for maintenance personnel due to the presence of water—which closes off the outlet after the air conditioner has been turned off and the reservoir has been drained, thereby preventing the escape of any latent excess water draining into the reservoir or the draining of water which collects in the reservoir when it rains.

OBJECT OF THE INVENTION

It is therefore an object of the present invention to provide an improved dump valve which obviates or at least minimizes the aforementioned disadvantages and/or provides a viable alternative to existing dump valves.

SUMMARY OF THE INVENTION

According to the present invention there is provided an hydraulic valve having a housing with closed and open structured portions in which a plunger is adapted for reciprocal movement; said closed portion incorporating an hydraulic fluid inlet and an hydraulic fluid outlet; said open structured portion incorporating a plug seat and plug stem; said plunger incorporating a sealing member on an end which reciprocates in the closed portion and a plug on the end which reciprocates in the open structured portion, there being provided spring means which normally bias the sealing member towards the inlet to prevent fluid communication between the inlet and the outlet; the construction and arrangement being such that when pressurized hydraulic fluid is passed through the inlet, it impacts upon the sealing member moving the plunger through the open structured portion of the housing to seat the plug on the plug seat, simultaneously bringing the inlet and outlet into fluid communication with one another.

Although the valve has been defined in terms of an hydraulic valve, that is, a valve for use with all manner of fluids, the primary use for which it has been developed is with water in evaporative air conditioners. The following description will therefore be restricted to such an embodiment in order to facilitate the understanding of the invention. It should always be borne in mind, however, that the invention has wider ramifications and is applicable to valves used in other contexts and with other fluids.

DESCRIPTION OF PREFERRED EMBODIMENTS

The hydraulic valve of the present invention is preferably used in association with a dual functioning water operated solenoid valve of the type which is the subject of Australian Patent Application No. PL 9114 to co-inventor L. Kittlety which comprises inlet and outlet solenoids operable through a transformer on a 24 volt power supply. The combined dual operating solenoid valve and hydraulic valve constitute the main componentry of the water maintenance and water removal system in a typical evaporative air conditioner. Here the componentry is tied into the pumping cycle of the air conditioner.

The hydraulic valve is fitted into the reservoir at the base of the air conditioner by mounting the plug seat level with the floor of the reservoir, with the plug stem extending through the floor and the housing extending upwardly from the floor. The dual operating solenoid valve is connected to the inlet in the housing and to a standard mains pressure water supply.

In operation, turning the air conditioner on, activates the electrical circuitry which opens the inlet solenoid of the dual functioning solenoid valve and closes the outlet solenoid, enabling a measured quantity of water to flow through the hydraulic valve to the air conditioner reservoir. There is a two minute delay on the pump start-up. Also, an optional shut-down timer for longer running period is provided. The water is recirculated in the evaporative air conditioner through the cooling pads and back to the reservoir. Top-up water is admitted as required by level sensing with a float valve or the like in the reservoir which is connected to the hydraulic valve.

During the on-cycle of the pump, the hydraulic valve maintains the plug in firm seating engagement with the outlet in the reservoir due to the pressure of water within its housing. However, as soon as the pump is turned off, i.e. when the air conditioner is switched off, the inlet solenoid valve shuts off water to the hydraulic valve, and the outlet solenoid opens to atmosphere, reducing the water pressure in the housing, and the spring means can then raise the plug from its seat allowing the water in the reservoir to discharge through the plug hole. Further, since the plug seat is level with the surface of the reservoir base, all water is thoroughly drained from the reservoir. Such drainage also occurs if it happens to rain as any water which washes down through the air conditioner pads will collect in the water reservoir and then run straight through the waste water outlet, allowing the air conditioner to dry out as soon as the rain ceases. The rainwater also serves to clean the pad.

The hydraulic valve housing can be constructed from typical valve materials, that is brass, stainless steel or like alloys, or durable plastics materials such as polyvinylchloride, polyethylene, polypropylene and the like. The latter materials are particularly preferred from a cost consideration as they can be used to economically injection mould the housing.

The plunger and sealing member can be constructed from the same materials as the housing, but may comprise a different selection of materials to that of the housing. Once again, they are preferably plastics materials. The sealing member will typically include plastics or rubber seals such as 0-rings or the like to prevent the passage of water past the sealing member.

The plug is preferably fabricated from a resilient material such as a cross-linked rubber to ensure good sealing contact with the outlet.

The hydraulic valve housing may comprise single or multiple components. Preferably, it comprises two components which are connected together by a complimentary screw thread on each component. One component which is typically the closed portion is suitably substantially cylindrical in construction and accommodates the sealing member. This portion also incorporates the inlet and outlet. The other component, which is typically the open structured portion, has a mid-regional cylindrical cage structure which acts as a guide for the plunger and the attached plug as well as the opening through which the waste water from the air conditioner discharges, and a cylindrical plug stem preferably formed integrally therewith which is adapted to extend beneath the water reservoir of the evaporative air conditioner.

The inlet in the closed cylindrical housing is suitably located in the end wall thereof and the outlet is suitably located in the side wall at a distance spaced from the inlet which is comparable to the distance by which the plug moves between it's seated and it's fully unseated locations.

Known spring means can be utilized for biasing the sealing member on the plunger towards the inlet in the housing. Such spring means may comprise a helical coil spring of non-corrosive material, such as high tensile stainless steel, which seats between a ledge in the end section of the closed portion and an internal cavity in the sealing member.

The sealing member can have any structure which meets the desired result, i.e. of providing a fluid tight seal but still being reciprocally moveable in the housing. It's configuration will be determined by the shape and internal dimensions of the closed portion of the housing. Typically, the housing has a cylindrical shape as mentioned above and the sealing member will thus usually also be cylindrical in shape.

DESCRIPTION OF DRAWINGS

Preferred embodiments of the invention will now be described with reference to the accompanying drawings, in which:

FIG. 2 is a view similar to FIG. 1 showing the valve in another configuration but without the solenoid; and FIG. 3 is a schematic representation of an evaporative air conditioner incorporating the hydraulic valve depicted in FIGS. 1 and 2.

In all the drawings, like reference numerals refer to like parts.

Figure 1:
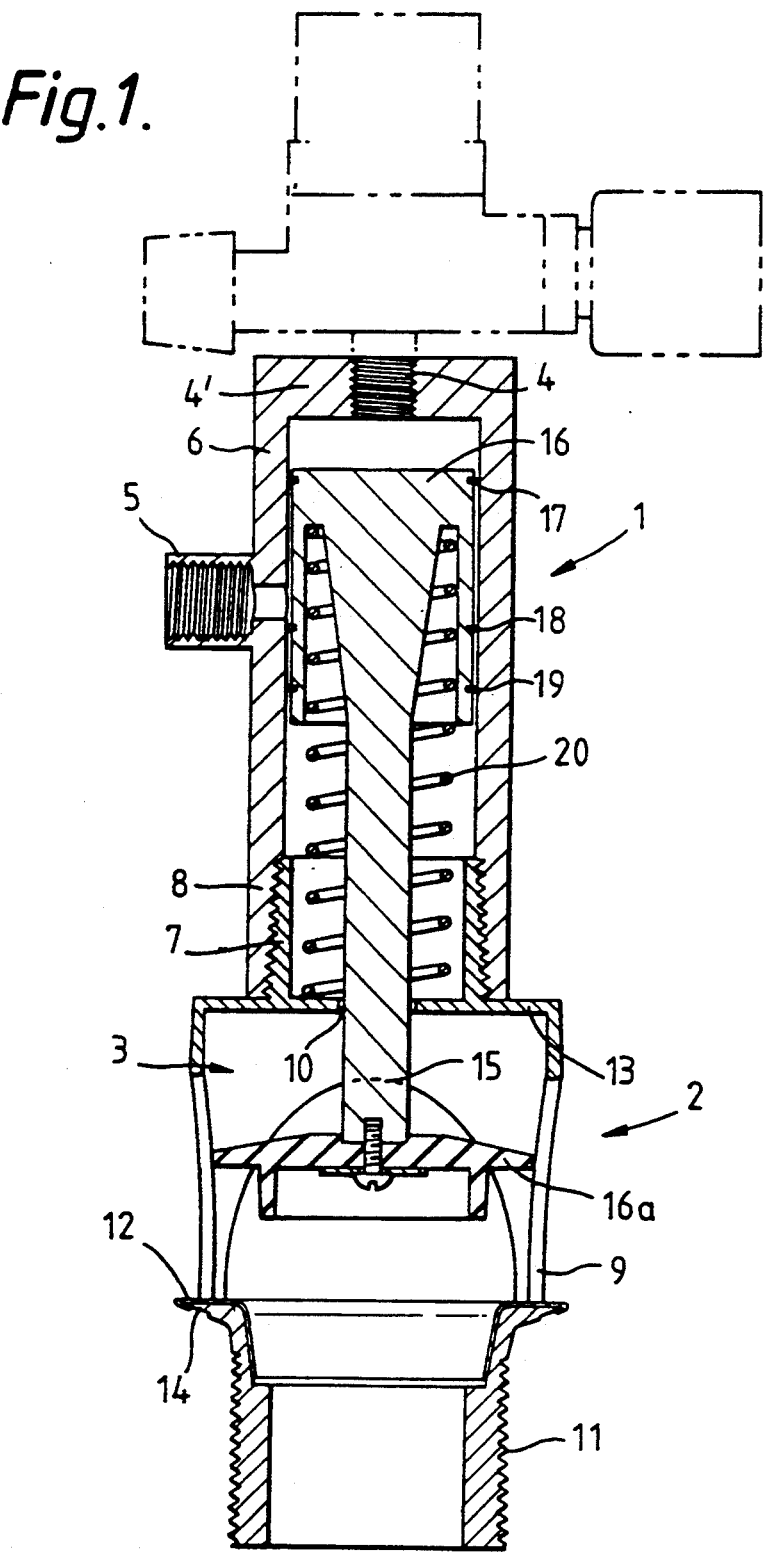
FIG. 1 is a vertical cross-sectional view of an hydraulic valve according to the present invention in one configuration with an associated dual acting solenoid valve shown in phantom.

Referring firstly to FIGS. 1 and 2, the hydraulic valve comprises a closed housing portion 1 and an open structured housing portion 2 with an internal plunger 3 which reciprocates between the two. The closed housing portion 1 is injection moulded from high density polyethylene polymer and has a cylindrical configuration with a water inlet 4 in the top end wall 4' and a water outlet 5 in a cylindrical side wall 6.

The open structured housing portion 2, which is also injection moulded from high density polyethylene polymer, is connected to closed housing portion 1 by a screw-threaded connection comprising an externally threaded shank 7 integrally formed on the end of portion 2 and an internally threaded recess 8 formed on the lower end of portion 1. The open structured housing portion 2 includes a cage section 9 which includes a narrow opening 10 for guiding the reciprocal movement of the plunger 3, and a plug stem 11 depending from a plug base 12. The plug stem 11 may be externally threaded if need be for ready screw connection to standard waste plumbing fixtures. The cage section 9 is open to the exterior except for a minimum number of supports connecting an upper wall 13 with the plug base 12. The plug base 12 is tapered at its periphery 14 to enable levelling with the base surface of the water receptacle of an evaporative air conditioner, thereby ensuring that there is no lip which would prevent all water from draining from the receptacle.

The plunger 3 comprises a stem 15, with an integrally formed enlarged head or sealing member 16 moulded from high density polyethylene polymer. The base of the plunger has a polybutadiene rubber plug 16a fitted to it which is adapted for sealing contact with the plug base 12 as shown in FIG. 2. The sealing member 16 has three rubber O-rings 17, 18, 19 fitted in grooves around its perimeter to provide a seal with the side wall 6 of the housing.

A stainless steel helical spring 20 is fitted into the sealing member and is restrained by the upper wall 13 of the open structured portion.

FIG. 2 shows the state of the valve when the valve is in the "off" mode, that is, when there is no water pushing on the sealing member 16. It will be observed that in this state, the helical spring 20 biases the plug 16a away from the plug seat, thereby allowing water in the reservoir to drain through the open-cage structure of the portion 2 with minimal restriction to the water flow.

FIG. 1 shows the valve in the "on" mode, that is when the inlet water has been turned on and water has been admitted to the valve through the inlet 4. The water pressure is sufficient to overcome the force of the helical spring 20 and push the sealing member 16 and plunger downwardly so that fluid communication is provided between the inlet 4 and outlet 5. Simultaneously the plug 16a is seated on the plug seat preventing the outflow of water through the caged structure.

FIG. 3 is a schematic view showing the hydraulic valve 30 fitted to an evaporative air conditioner 31. The valve is fitted to stand perpendicular in the base of the water reservoir 32, with the plug stem 11 projecting therethrough. A dual acting solenoid valve 33 is provided for controlling the flow of water into the hydraulic valve and opens into the housing inlet 4. The solenoid valve 33 is connected in electrical sequence to the pump circuitry 34 and to a 24 volt transformer 35. The amount of water in the reservoir is sensed by float 36 which connects to the outlet 5 of the hydraulic valve. When the float 36 drops below a pre-set level, top up water is admitted into the reservoir.

In operation, when the evaporative air conditioner is turned on, an inlet solenoid of the dual acting solenoid 33 opens, admitting water to the hydraulic valve 10. Simultaneously, an outlet or pressure relief solenoid closes, shutting off the interior of the hydraulic valve to the atmosphere. The water pushes the plunger down, opening the communication between the inlet and outlet of the valve housing, and simultaneously sealing the water outlet with the plug. After a pre-determined amount of water has been admitted, as sensed by the float valve, the admission of further water into the reservoir is halted. The pump 37 then commences pumping the water into the cooling pads where air is blown for circulation through an associated evaporative air conditioning system. As water is drawn from the system, the float valve lowers until a point is reached where the float valve can let in replacement water to top up the reservoir.

When the air conditioning unit is turned off, the inlet solenoid valve closes so that no more water can enter the hydraulic valve. Simultaneously, the outlet solenoid opens, venting the interior of the hydraulic valve to the atmosphere. The plunger then rises under the force exerted by the coil spring, closing off the outlet 5 and simultaneously raising the plug 16a from its seat to permit water in the reservoir to drain away.

The arrangement thus described overcomes the problems of prior art systems by permitting complete drainage of the reservoir when the air conditioner is switched off. Furthermore, in view of the fact that the outlet from the reservoir remains open after turning off, any latent water in the air conditioner is still able to drain away, leaving a completely dry reservoir, thus reducing the potential for microorganism growth to be reduced to zero for all practical purposes. The installation meets AS3666 when the RT system is fitted. The system uses available water pressure to keep the valve closed, not electric.

I claim:

1. An hydraulic valve having a housing with closed and open structured portions in which a plunger is adapted for reciprocal movement; said closed portion incorporating an hydraulic fluid inlet and an hydraulic fluid outlet; said open structured portion incorporating a plug seat and plug stem; said plunger incorporating a sealing member on an end which reciprocates in the closed portion and a plug on the end which reciprocates in the open structured portion, there being provided spring means which normally bias the sealing member towards the inlet to prevent fluid communication between the inlet and the outlet; the construction and arrangement being such that when pressurized hydraulic fluid is passed through the inlet, it impacts upon the sealing member moving the plunger through the open structured portion of the housing to seat the plug on the plug seat, simultaneously bringing the inlet and outlet into fluid communication with one another.

2. An hydraulic valve as claimed in claim 1, wherein said housing portions comprise cylindrical body sections, each of which housing portions are co-axially connected together by complementary screw threads on each portion.

3. An hydraulic valve as claimed in claim 2, wherein said hydraulic fluid inlet is in the end wall of the closed cylindrical body section and the outlet is located in the side wall of the closed cylindrical body section at a distance spaced from the inlet which is comparable to the distance by which the plug moves between it's seated and it's fully unseated locations.

4. An hydraulic valve as claimed in any one of claim 1 or claim 2, wherein the spring means comprises a helical coil spring of high tensile stainless steel located between an internal ledge of the end section of the closed portion of the housing and the sealing member.

5. An hydraulic valve as claimed in claim 1 or claim 2, wherein said open structured portion includes a narrow opening through which the plunger reciprocates, large openings which permit unhindered flow of water to the plug seat, and internal walls which guide the plug to the plug seat.

6. An hydraulic valve as claimed in claim 1 or claim 2 and which is designed to operate on water pressure.

7. An hydraulic valve as claimed in claim 1 or claim 2 in combination with a solenoid valve, which solenoid valve is fitted to the hydraulic fluid inlet of the hydraulic valve, and controls the flow of hydraulic fluid into the hydraulic valve.

* * * * *